UNITED STATES PATENT OFFICE.

GEORGE MATHIOT, OF WASHINGTON, DISTRICT OF COLUMBIA.

MODE OF CONSTRUCTING PHOTOGRAPHIC BATHS AND PANS.

Specification forming part of Letters Patent No. 17,162, dated April 28, 1857.

*To all whom it may concern:*

Be it known that I, GEORGE MATHIOT, of Washington, in the District of Columbia, have invented a new and Improved Mode of Constructing the Baths and Pans used in Photography; and I hereby declare that the following is a full and exact description of the said improvement.

The nature of my improvement consists in combining an earthy substance with a non-absorbent gum or wax, or other similar substance, to form a vessel perfectly impervious to the photographic solutions. I form a mixture of earthy matter with the non-absorbent cement by liquifying the cement by heat or by solution, and working in the earth in powder in such proportion that when the combined earth and cement shall have cooled or concreted it shall become rigid, and with this material I form the intended vessel. For the earth I use any substance which will not be fused by the degree of heat required to melt the cement, and will not be acted on by the chemical solutions to be used in the vessel; and for the cement I use wax, resin, gum, or other substance capable of cementing the earthy matter together. But it is to be noted that this specification of substances is not intended to embrace those preparations of "gum-caoutchouc" or of "gum gutta-percha" called "vulcanized," in which the gum is supposed to be permanently altered by chemical union with the other substance. These preparations I do not consider as mere combinations of the mechanical properties of an earth with those of a gum, and therefore not coming within the intentions of this specification. Of the various substances I prefer to use a mixture of shellac and fine sand, or pulverized silex. This mixture can be readily pressed in molds, and forms a very strong and cleanly vessel. I also make the vessel by first forming the earthy matter into shape, and afterward saturate it with the cement substance. The vessel may be molded of any substance which will not act on the chemical solution to be used, and be made impervious to aqueous solutions by saturating it with any substance which will solidify in the pores after being injected in a liquid state produced by heat or by solution in a menstruum. The vessel may conveniently be formed of unglazed pottery-ware, either earthenware, stoneware, or porcelain, and be saturated with wax, gum, balsam, resin, pitch, stearine, or any of the siccative oils, or with mixtures of these. If the softer kinds of cement have been used to fill the pores of the earthy matter, the surface of the vessel may afterward be varnished with asphaltum or shellac to prevent the adhesion of dirt. In constructing the vessels I prefer to use the closer kinds of biscuit, and to saturate it with beeswax or with beeswax and resin, and afterward to varnish with asphaltum. By this I obtain a vessel having great strength, and requiring but little cement to saturate it, cleanly to the touch, and impervious to the photographic solutions.

To enable others to make and use my invention, I proceed to describe it more particularly.

I make the mixture of pulverized shellac and fine sand or pulverized silex in the proportion of one part of shellac in two parts of silex; but the proportion will vary according to the fineness of the silex; but it does best when the proportion is such that the mixture, when at a heat of 175° Fahrenheit, shall be plastic but not limpid. I then heat the mixture in a water or sand bath, and stir it about till the lac and silex are thoroughly incorporated, and as soon as the mass has come to a doughy constituency I form it into the desired shape, either by the hands or by use of machines called "molds," the construction and use of which is well understood and not of my invention. After the vessel is cooled to ordinary temperature, it is ready for use. Again, I construct the vessel by having a "potter" to make the desired shape in unglazed ware. When it is in the condition called "biscuit," I take the biscuit-vessel and heat it to a temperature of 240°, or thereabout, and fill the vessel with melted wax or wax and resin, and keep it fluid until it penetrates to the outside of the vessel, and then apply the melted wax or wax and resin to the exterior. As the wax is about to set, I wipe off any excess from surface, and when cold I varnish with asphaltum.

What I claim as my invention and improvement, and desire to secure by Letters Patent, is—

To construct the baths and vessels for photographic uses of an impervious substance formed by the combination of a cement with an earthy matter or its equivalent; and also to form the bath or other vessel by first forming the vessel of unglazed pottery or its equivalent, and making the pottery impervious by saturating it with wax, gum, balsam, resin, pitch, stearine, or siccative oil, or the equivalent for any one of them.

GEORGE MATHIOT.

Witnesses:
A. G. PENDLETON,
CHAS. F. STANSBURY.